Patented July 19, 1949

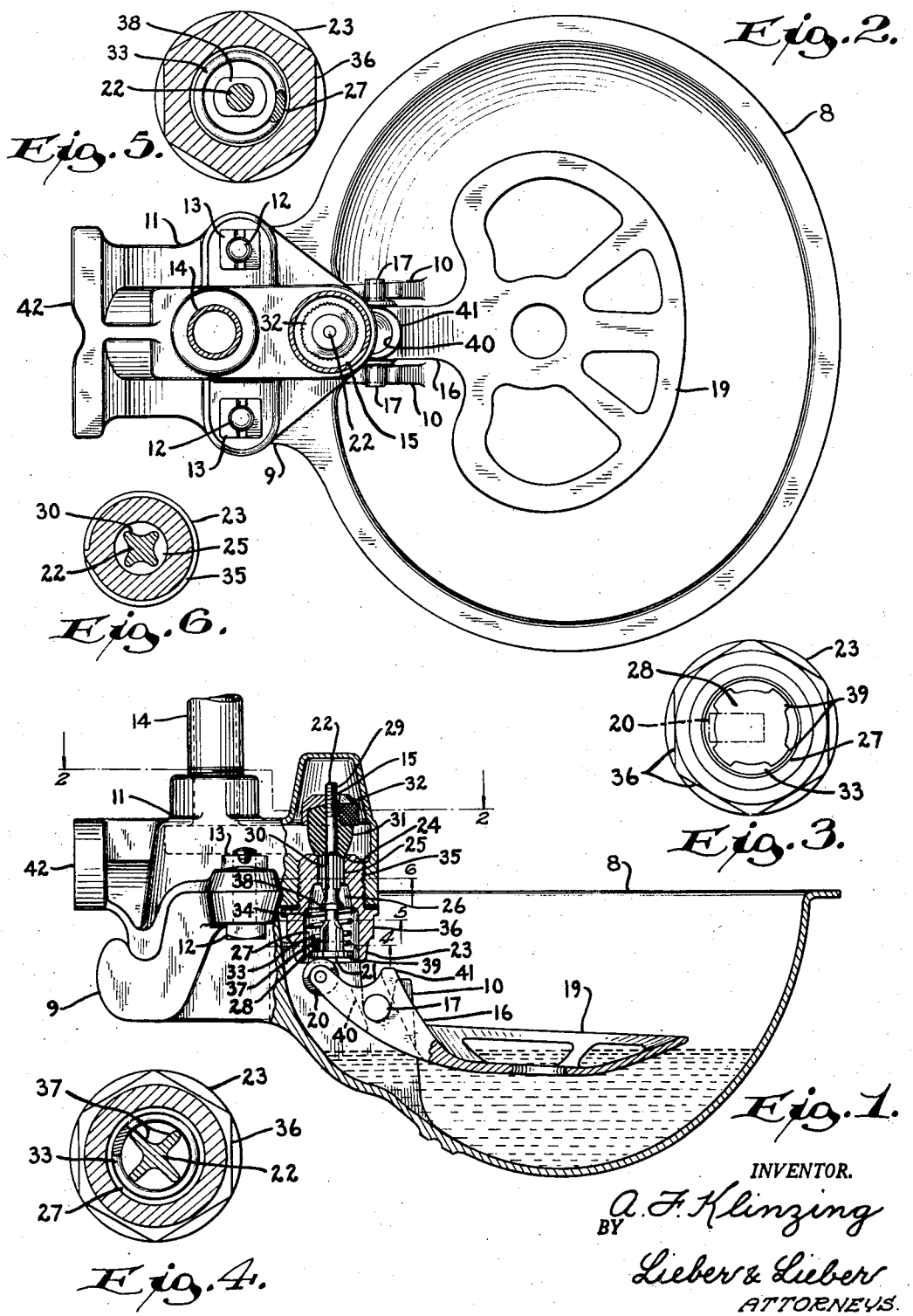

2,476,876

UNITED STATES PATENT OFFICE 2,476,876

STOCK WATERING FOUNTAIN

August F. Klinzing, Milwaukee, Wis.

Application November 12, 1946, Serial No. 709,331

1 Claim. (Cl. 119—75)

This invention relates generally to improvements in the construction and operation of stock watering fountains, and relates more specifically to improvements in the animal actuated mechanism for feeding fresh liquid to the drinking bowl of such a fountain.

The primary object of the present invention is to provide improved animal actuated mechanism for effecting delivery of fresh water to a drinking fountain bowl, whereby the liquid will be gradually but abundantly supplied as needed, with minimum effort on the part of the animals and without unduly frightening the drinking animals.

It has heretofore been common practice to water stock by utilizing fresh liquid receptacles or bowls each provided with a water supply valve and an animal nose actuated lever for operating the valve, and I have manufactured and sold large quantities of these devices in the past. While these prior stock watering fountains have been quite satisfactory and successful, I have found that most of them require considerable effort on the part of the drinking animals, in order to actuate the fresh liquid supply valves, especially when the devices are idle and not in use for extensive periods of time. Then, too, the prior fountain assemblages were apt to frighten the animals because they delivered the fresh liquid to the bowls with considerable force, and they could not be regulated so as to eliminate this objection and to gradually admit the fresh water supply.

It is therefore a more specific object of my present invention to provide an improved stock watering device which obviates all of the above-mentioned difficulties and objections, and which is operable to gradually and smoothly admit the fresh water to the drinking basin irrespective of the supply pressure.

Another specific object of the invention is to provide an improved animal drinking fountain which is simple, compact and durable in construction, and which may be readily installed and suspended from diverse types of supports.

A further specific object of this invention is to provide an improved animal nose actuated watering unit which requires minimum effort for effective operation thereof, and wherein the actuating mechanism cannot stick or become jammed so as to interfere with easy operation thereof.

Still another specific object of my invention is to provide an improved automatic drinking fountain having valve actuating and adjusting devices for readily varying the normal functioning thereof so as to meet different conditions of operation, and which requires minimum machining whereby it may be manufactured at moderate cost.

An additional specific object of the present invention is to provide an improved stock waterer all parts of which are readily accessible for inspection and adjustment, and which is composed of few relatively simple parts adapted to be readily assembled or dismantled.

These and other specific objects and advantages of the invention will be apparent from the following detailed description.

A clear conception of the several features constituting this improvement, and of the construction and operation of my improved stock watering fountain, may be had by referring to the drawing accompanying and forming a part of this specification in which like reference characters designate the same or similar parts in the various views.

Fig. 1 is a part sectional side elevation of a typical nose actuated animal drinking fountain embodying the invention, the section having been taken vertically and centrally through the bowl and the fresh liquid supply valve;

Fig. 2 is a part sectional top view of the same fully assembled fountain, the section having been taken through the valve casing along the line 2—2 of Fig. 1;

Fig. 3 is an enlarged bottom view of the fresh liquid supply valve, showing the valve actuating roller coacting therewith, in dot-and-dash lines;

Fig. 4 is a transverse horizontal section through the enlarged valve unit, taken along the line 4—4 of Fig. 1;

Fig. 5 is a similarly enlarged transverse section through the control valve and casing, taken along the line 5—5 of Fig. 1; and Fig. 6 is still another likewise enlarged transverse section through the fresh water feed valve, taken along the line 6—6 of Fig. 1.

While the improvement has been shown and described as being advantageously applicable to a particular nose actuated type of drinking fountain for cattle, it is not my desire or intent to unnecessarily limit the scope or the utility of the improved features by virtue of this typical embodiment.

Referring to the drawing, the improved typical stock watering fountain shown therein, comprises in general, a main water receptacle or bowl 8 having a rear upwardly open socketed suspension projection 9 formed integral therewith, and being provided adjacent to said projection with a pair of integral laterally spaced saddles 10; a liquid supply casing 11 having an integral depending lug engageable with the socket of the bowl projection and being detachably secured to the top of the bowl projection 9 by means of bolts 12 and lock nuts 13, and also being provided with a fresh water supply pipe 14 and with an adjustable flow control valve assemblage 15, the latter being disposed within the bowl 8 rearwardly of and above the saddles 10; and a nose actuatable lever 16 swingably suspended from the saddles 10 by means of integral pivot pins 17, and having a front dish shaped nose contact plate 19 located above the bowl bottom, while its rear end portion is provided with an anti-friction roller 20 adapted to ride upon the lower flat face 21 of the valve stem 22.

The flow control valve assemblage 15 consists of a main hollow valve casing 23 having an upper valve seat 24, a central bore 25 adjoining the seat 24, and a succession of circular tapered and cylindrical diffusion chambers 26, 27 respectively, disposed concentrically of the bore 25 and seat 24; the elongated valve grinding stem 22 located centrally within the tubular casing 23 and having a lower integral flange 28 formed with the flat contact face 21, an integral upper threaded portion 29 and intervening integral guide ribs 30 coacting with the bore 25; a compressible rubber valve body or member 31 snugly embracing the stem portion 29 and coacting with the valve seat 24, the member 31 being held in place by a peripherally knurled adjusting nut or adjustable cap 32 coacting with the screw threaded portion 29 of the valve stem 22; and a helical compression spring 33 loosely surrounding the stem 22 within the chamber 27 and coacting at one end with the stem flange 28 and at its opposite end with an annular shoulder 34 formed on the casing 23 at the junction of the chambers 26, 27.

The valve casing 23 has external screw threads 35 adapted for attachment to the liquid supply casing 11, and is also provided with an external hexagonal or otherwise polygonal portion 36 for facilitating attachment and removal of the valve unit with the aid of an ordinary wrench. The valve stem 22, in addition to having the flange 28 and ribs 30 formed thereon, is also provided with integral lower radial vanes 37 adjacent to the flange 28, and with an integral medial flange 38 movable within the tapered chamber 26. The lower flange 28 has outwardly projecting lugs 39 which are cooperable with the wall of the lower cylindrical chamber 27, and the upper radial ribs 30 are likewise cooperable with the bore 25, in order to properly guide the stem 22 in its movement. The vanes 37 are cooperable with the spring 33 so as to properly centralize this spring, and these vanes 37 also cooperate with the helical spring 33 to provide a tortuous path for the liquid flowing through the chamber 27. The medial flange 38 cooperates with the tapered wall of the chamber 26 to baffle the flow of liquid through this chamber, more or less depending upon the extent to which the valve is opened.

The resilient valve member 31 is movable with the adjusting nut or cap 32 longitudinally of the stem 22 by reason of the threaded coaction of the cap 32 with the threaded portion 29 of the stem, and consequently adjustment of the tension of the valve spring 33 may thereby be effected so as to vary the effort required to actuate the valve. Although this adjustment of the spring tension, as afforded by the knurled cap 32 through its coaction with the resilient valve member 31 and the threaded stem portion 29, may be more or less slight, only a limited range of adjustment is necessary for the desired results. The roller 20 carried by the lever 16 as well as the valve stem 22, or at least the lower face 21 thereof, are preferably formed of non-corrosive material so as to prevent sticking; and the lever 16 is provided with a central hole or through opening 40 adjacent the valve discharge chamber 27 to permit liquid flowing through the chamber 27 to enter the bowl 8 smoothly and without turbulence. The lever 16 is also provided with an integral upwardly directed stop 41 which is adapted to coact with the casing 23 upon upward movement of the free end 19 of the lever 16 to prevent removal of this lever 16 after the device has been properly assembled.

To assemble the improved device, the spring 33 is first positioned on the valve stem 22, the stem 22 is passed through the bore 25 of the casing 23 with the spring 33 housed in the chamber 27, and the member 31 and cap 32 are applied in an obvious manner to the threaded portion 29 of the stem to complete the valve unit, the cap 32 being adjusted to produce proper tension of the spring 33. The unitary valve assemblage 15 is next applied to the liquid supply casing 11 as shown in Fig. 1 by means of the screw threads 35. Before applying the liquid supply casing 11 to the bowl 8, the lever 16 must be positioned as shown in Fig. 1 with the pivot pins 17 resting in the saddles 10 and with the nose plate 19 in the bowl 8. Finally, the liquid supply casing 11, with the valve assemblage 15 secured thereto, may be applied to the bowl 8 and secured firmly in place by means of the bolts 12 and lock nuts 13. The improved watering fountain is thus completely assembled and may be mounted on the desired support by the bracket 42 in any convenient manner, liquid being supplied to the unit through the supply pipe 14.

After the watering device has thus been properly assembled and during operation thereof, whenever the nose plate 19 at the outer end of the lever 16 and within the bowl 8 is pressed downwardly, the non-corrosive roller 20 coacts with the flat lower face 21 of the valve stem 22 in an obvious manner to raise the stem 22 and the member 31 carried thereby away from the annular seat 24, and the spring 33 will be compressed. With the valve stem 22 thus raised and the spring 33 compressed, liquid under pressure will then enter the valve bore 25 and will flow downwardly through the tapered chamber 26 where the medial flange 38 will initially baffle the liquid and partially reduce the pressure thereof. The liquid will then flow downwardly through the cylindrical chamber 27; and during its passage through this chamber, it will be caused to flow primarily along the tortuous path provided by the helical spring 33 and by the radial vanes 37 of the stem, thereby materially reducing the pressure thereof. As the liquid leaves the lower end of the chamber 27, the main body thereof is caused to flow into the bowl 8 through the opening or channel 40 in the lever 16 in a smooth stream and without turbulence, its velocity having been reduced in its passage through the valve unit to such an extent that the flow will be gradual but steady and its direction of discharge through the channel 40 and into the bowl having been such as to avoid undesirable disturbances within the bowl 8. It is to be noted that as the valve is opened to a greater extent, this baffling and reduction in pressure becomes greater due to the fact that the flange 38 moves upwardly, and the coils of the spring 33 move closer toward each other. Upon release of the lever 16, the valve member 31 will be quickly returned to the seat 24 by the action of the spring 33, thus causing the valve to close automatically; and the valve is quickly responsive to movements of the actuating lever 16, friction losses and possible sticking and jamming having been minimized by the coaction of the non-corrosive roller with the flat lower face of the valve stem.

From the foregoing detailed description, it will be apparent that my present invention provides an improved stock watering fountain and control valve therefor which is extremely simple and compact in construction and which is also highly efficient in normal use. It is to be particularly noted that the valve is of unitary construction, the spring being confined entirely within the casing 23 and the various parts being retained in adjusted position by the cap 32 when applied to the threaded portion 29 of the stem, and the valve assemblage may therefore be furnished as a complete unit without necessitating provision of additional loose parts. The location of the spring within the valve casing 23 provides an effective tortuous path of travel for the liquid and provision of the adjusting cap 32 makes it possible to adjust the tension of the spring so as to minimize the effort required to actuate the valve and while the adjustment afforded by the cap 32 is slight, not much of a range of adjustment is necessary for the desired results. The improved valve assemblage may obviously be quickly and conveniently applied to or removed from the liquid supply casing 11 with the aid of an ordinary wrench, and the entire structure may likewise be quickly and conveniently assembled or dismantled. To dismantle the device for shipping or the like, it is only necessary to remove the bolts 12, and the lever 16 and unitary supply casing 11 including the valve assemblage may then be placed in the bowl 8 and packaged. The roller 20 reduces friction to a minimum during actuation of the lever 16, and the chambers 26, 27 and associated parts as well as the opening 40 cooperate to reduce the velocity of the liquid and direct it into the bowl 8 with a minimum of turbulence. The various parts of the improved device may be manufactured at moderate cost, and the improved drinking fountain and its control valve has proven highly successful in actual use for stock watering.

It should be understood that it is not desired or intended to limit this invention to the exact details of construction or to the precise mode of use herein shown and described, for various modifications within the scope of the appended claim may occur to persons skilled in the art to which this invention pertains.

I claim:

A stock watering unit comprising, a one-piece stationary liquid supply and bowl supporting casing having a depending integral rear lug and a downwardly open threaded front socket, a liquid confining bowl having therein upwardly open saddles disposed forwardly of said casing socket and also being provided with a rear upwardly open socket for receiving said casing lug, bolts detachably uniting said bowl and casing between said casing and bowl sockets, a liquid supply valve having a housing threaded within said casing socket and also having an actuating stem directed into said bowl laterally of and between said saddles, and a nose actuable lever within said bowl having pivots swingably confined by said valve housing within said saddles and being provided with a rear extension for actuating said valve stem.

AUGUST F. KLINZING.

REFERENCES CITED

The following references are of record in the file of this patent:

UNITED STATES PATENTS

| Number | Name | Date |
|---|---|---|
| 1,296,586 | Louden | Mar. 4, 1919 |
| 1,384,346 | Rassmann | July 12, 1921 |
| 1,594,966 | Klinzing | Aug. 3, 1926 |
| 1,640,649 | Dickow | Aug. 30, 1927 |
| 1,652,046 | Rassmann | Dec. 6, 1927 |
| 1,824,116 | Boyden | Sept. 22, 1931 |
| 1,879,788 | Brown | Sept. 27, 1932 |
| 2,260,817 | Anderson | Oct. 28, 1941 |